United States Patent [19]

Hillshafer et al.

[11] Patent Number: 4,687,788

[45] Date of Patent: Aug. 18, 1987

[54] DIMENSIONALLY STABLE URETHANE ELASTOMERS

[75] Inventors: Douglas K. Hillshafer; Robert B. Turner, both of Lake Jackson, Tex.

[73] Assignee: The Dow Chemical Company, Midland, Mich.

[21] Appl. No.: 555,328

[22] Filed: Nov. 25, 1983

Related U.S. Application Data

[63] Continuation-in-part of Ser. No. 433,595, Oct. 8, 1982, abandoned.

[51] Int. Cl.[4] ............................................. C08G 18/14
[52] U.S. Cl. .................................... 521/163; 521/167; 521/169; 521/174; 521/176; 528/75; 528/76; 528/77; 528/78; 528/79

[58] Field of Search ............... 521/163, 167, 169, 174, 521/176; 528/75, 76, 77, 78, 79

[56] References Cited

U.S. PATENT DOCUMENTS

| | | | |
|---|---|---|---|
| 3,892,691 | 7/1975 | White et al. | 521/176 |
| 3,945,939 | 3/1976 | Barron | 521/176 |
| 4,243,760 | 1/1981 | McDaniel et al. | 521/176 |
| 4,246,363 | 1/1981 | Turner et al. | 521/163 |
| 4,269,945 | 5/1981 | Vanderhiden et al. | 521/159 |
| 4,301,110 | 11/1981 | Cuscurida et al. | 521/176 |
| 4,312,973 | 1/1982 | Critchfield et al. | 528/76 |

*Primary Examiner*—Maurice J. Welsh

[57] ABSTRACT

Urethane elastomers are prepared which have a percent linear dimensional change after being immersed in water of not greater than 0.80%.

14 Claims, No Drawings

DIMENSIONALLY STABLE URETHANE ELASTOMERS

CROSS REFERENCE TO RELATED APPLICATIONS

This application is a continuation-in-part of application Ser. No. 433,595 filed Oct. 8, 1982, now abandoned.

BACKGROUND OF THE INVENTION

The present invention concerns urethane elastomers.

Urethane elastomers have many applications such as sewer tile gaskets, industrial belts, roller covers and rollers, shoe soles, etc. and even more recently various automobile applications such as facia, fenders, and the like. However, for the most part, these urethane elastomers are subject to dimensional change when subjected to moisture which causes parts not to fit properly and in the case of painted automobile parts, the paint tends to release from the urethane elastomer due to the dimensional change.

It has now been discovered that urethane elastomers can be prepared from a composition containing a relatively high equivalent weight polyo, a relatively low equivalent weight chain extender and a polyisocyanate which have a reduced percent linear dimensional change when subjected to moisture.

SUMMARY OF THE INVENTION

One aspect of the present invention pertains to a urethane elastomer prepared from a composition comprising (A) a polyether polyol or polyol mixture containing less than about 10, preferably less than about 5, percent by weight of oxyethylene moities and which contains at least about 10, preferably at least about 20, percent by weight of oxybutylene moities, (B) a relatively low equivalent weight chain extender and a polyisocyanate or polyisothiocyanate which urethane elastomer has a percent linear dimensional change ($\Delta L$) after being immersed in deionized water at 72° F. (22.2° C.) for a period of 240 hours (864000 s) of not greater than about 0.6%, said linear dimensional change being the average value of 5 specimens of the dimensions $6'' \times 1'' \times \frac{1}{8}''$ (15.24 cm $\times$ 2.54 cm $\times$ 0.3175 cm) which have been post heated at 158° F. (70° C.) for 24 hours (86400 s) followed by cooling in a dry box for 3 hours (10800 s) at 72° F. (22.2° C.) prior to immersion in said deionized water.

Another aspect of the present invention pertains to a urethane elastomer prepared from a composition comprising (A) a polyether polyol or polyol mixture containing less than about 10, preferably less than about 5, percent by weight of oxyethylene moities and which contains at least about 10, preferably at least about 20, percent by weight of oxybutylene moities, (B) a relatively low equivalent weight chain extender and a polyisocyanate or polyisothiocyanate which urethane elastomer has a percent linear dimensional change ($\Delta L$) after being immersed in deionized water at 72° F. (22.2° C.) for a period of 240 hours (864000 s) of not greater than about 0.50%, said linear dimensional change being the average value of 5 specimens of the dimensions $6'' \times 1'' \times \frac{1}{8}''$ (15.24 cm $\times$ 2.54 cm $\times$ 0.3175 cm) which have been post heated at 158° F. (70° C.) for 24 hours (86400 s) followed by cooling in a dry box for 3 hours (10800 s) at 72° F. (22.2° C.) prior to immersion in said deionized water.

A further aspect of the present invention concerns a urethane elastomer prepared from a composition comprising (A) a polyether polyol or polyol mixture containing less than about 10, preferably less than about 5, percent by weight of oxyethylene moities and which contains at least about 10, preferably at least about 20, percent by weight of oxybutylene moities, (B) a relatively low equivalent weight chain extender and a polyisocyanate or polyisothiocyanate which urethane elastomer has a percent linear dimensional change ($\Delta L$) after being immersed in deionized water at 72° F. (22.2° C.) for a period of 240 hours (864000 s) of not greater than about 0.3%, said linear dimensional change being the average value of 5 specimens of the dimensions $6'' \times 1'' \times \frac{1}{8}''$ (15.24 cm $\times$ 2.54 cm $\times$ 0.3175 cm) which have been post heated at 158° F. (70° C.) for 24hours (86400 s) followed by cooling in a dry box for 3 hours (10800 s) at 72° F. (22.2° C.) prior to immersion in said deionized water.

DETAILED DESCRIPTION OF THE PREFERRED EMBODIMENTS

The relatively high molecular weight hydroxyl-containing polyols which can be employed herein are those polyether polyols which have an average hydroxyl functionality of from about 2 to about 8, preferably from about 2 to about 4 and most preferably from about 2 to about 3 and an average hydroxyl equivalent weight of from about 500 to about 5000, preferably from about 1000 to about 3000 and most preferably from about 1500 to about 2500 including mixtures thereof.

Suitable relatively high molecular weight polyether polyols which can be employed herein include those which are prepared by reacting an alkylene oxide, halogen substituted or aromatic substituted alkylene oxide or mixtures thereof with an active hydrogen-containing initiator compound.

Suitable such oxides include, for example, ethylene oxide, propylene oxide, 1,2-butylene oxide, 2,3-butylene oxide, styrene oxide, epichlorohydrin, epibromohydrin, mixtures thereof and the like.

When ethylene oxide is employed, it should not constitute more than about 10% by weight of the polyol. The preferred alkylene oxide is 1,2-butylene oxide.

Suitable initiator compounds include water, ethylene glycol, propylene glycol, butanediol, hexanediol, glycerine, trimethylol propane, pentaerythritol, hexanetriol, sorbitol, sucrose, hydroquinone, resorcinol, catechol, bisphenols, novolac resins, phosphoric acid, mixtures thereof and the like.

Also suitable as initiators for the relatively high molecular weight polyols include, for example, ammonia, ethylenediamine, diaminopropanes, diaminobutanes, diaminopentanes, diaminohexanes, diethylenetriamine, triethylenetetramine, tetraethylenepentamine, pentaethylenehexamine, ethanolamine, aminoethylethanolamine, aniline, 2,4-toluenediamine, 2,6-toluenediamine, diaminodiphenyloxide (oxydianiline), 2,4'-diaminodiphenylmethane, 4,4'-diaminodiphenylmethane, 1,3-phenylenediamine, 1,4-phenylenediamine, naphthylene-1,5-diamine, triphenylmethane-4,4'4''-triamine, 4,4'-di(methylamino)-diphenylmethane, 1-methyl-2-methylamino-4-aminobenzene, 1,3-diethyl- 2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6diaminobenzene, 3,5,3',5'-tetraethyl-4,4'-diaminodiphenylmethane and amine aldehyde condensation products such as the polyphenyl-polymethylene polyamines produced from aniline and formaldehyde, mixtures thereof and the like.

Also suitable as relatively high molecular weight polyols are the aminated products resulting from subjecting the above mentioned polyols to amination conditions in the presence of ammonia or other amines.

Other polyols which can be employed herein include copolymer-containing polyols such as, for example, those disclosed in U.S. Pat. Nos. RE 29,118 (Stamberger), RE 28,715 (Stamberger), RE 29,014 (Pizzini et al) and 3,869,413 (Blankenship et al) all of which are incorporated herein by reference.

Suitable chain extenders which can be employed herein include hydroxyl-containing compounds, aliphatic amines, aromatic amines or mixtures thereof.

Suitable hydroxyl-containing chain extenders include, for example, ethylene glycol, propylene glycol, trimethylol propane, 1,4-butane diol, diethylene glycol, dipropylene glycol, bisphenols, hydroquinone, catechol, resorcinol, triethylene glycol, tetraethylene glycol, dicyclopentadienediethanol, glycerine, low molecular weight ethylene and/or propylene oxide derivatives of glycerine, ethylene diamine, diethylenetriamine, mixtures thereof and the like.

Suitable aliphatic amine-containing chain extenders which can be employed herein include, for example, ethylene diamine, 1,3-diaminopropane, 1,4-diaminobutane, isophoronediamine, diethylenetriamine, ethanolamine, aminoethylethanolamine, diaminocyclohexane, hexamethylenediamine, methyliminobispropylamine, iminobispropylamine, bis(aminopropyl)piperazine, aminoethyl piperazine, 1,2-diaminocyclohexane, polyoxyalkyleneamines, bis(p-aminocyclohexyl)methane, triethylenetetramine, tetraethylenepentamine, mixtures thereof and the like.

Particularly suitable are the aminated polyoxypropylene glycols having an average amino hydrogen equivalent weight of from about 60 to about 110.

The term aliphatic amine as employed herein includes also the cycloaliphatic amines and heterocyclic aliphatic amines so long as they contain at least one primary amine group.

Suitable aromatic amines which can be employed herein as a chain extender include, for example, 2,4-bis(p-aminobenzyl)aniline, 2,4-diaminotoluene, 2,6-diaminotoluene, 1,3-phenylenediamine, 1,4-phenylenediamine, 2,4'-diaminodiphenylmethane, 4,4'-diaminodiphenylmethane, naphthalene-1,5-diamine, triphenylmethane-4,4',4''-triamine, 4,4'-di(methylamino)-diphenylmethane, 1-methyl-2-methylamino-4-aminobenzene, polyphenyl-polymethylene polyamines, 1,3-diethyl-2,4-diaminobenzene, 2,4-diaminomesitylene, 1-methyl-3,5-diethyl-2,4-diaminobenzene, 1-methyl-3,5-diethyl-2,6-diaminobenzene, 1,3,5-triethyl-2,6-diaminobenzene, 3,5,3',5'-tetraethyl-4,4'-diaminodiphenylmethane, 4,4'-methylene-bis(2,6-diisopropyl mixtures thereof and the like.

Also suitable as chain extender compounds are those compounds having at least one hydroxyl and at least one primary amine group per molecule. Suitable such compounds include, for example, ethanolamine, 1,2-propanolamine, N-aminoethylethanolamine, mixtures thereof and the like.

Suitable polyisocyanates include the organic aromatic and aliphatic polyisocyanates or mixtures thereof.

Suitable organic aromatic polyisocyanates which can be employed herein include, for example, any such polyisocyanate having 2 or more NCO groups per molecule such as, for example, 2,4-toluenediisocyanate, 2,6-toluenediisocyanate, p,p'-diphenylmethanediisocyanate, p-phenylenediisocyanate, naphthalenediisocyanate, polymethylene polyphenylisocyanates, mixtures thereof and the like.

Also suitable are organic aromatic polyisocyanates and the prepolymers prepared from such polyisocyanates and compounds having 2 or more active hydrogen atoms.

Suitable organic aliphatic polyisocyanates include, in addition to the hydrogenated derivatives of the above mentioned organic aromatic polyisocyanates, 1,6-hexamethylene diisocyanate, 1,4-cyclohexyl diisocyanate, 1,4-bis-isocyanatomethyl-cyclohexane, mixtures thereof and the like.

Also suitable are the corresponding polyisothiocyanates.

The polyurethanes can be prepared either in the presence or absence of a catalyst. Those polyurethanes prepared from amine containing polyols do not usually require a Catalyst although catalysts can be employed if desired. On the other hand, those polyurethanes prepared from polyols which do not contain nitrogen atoms are prepared in the presence of a catalyst.

Suitable catalysts which may be employed herein include, for example, organo-metal compounds, tertiary amines, alkali metal alkoxides, mixtures thereof and the like.

Suitable organo-metal catalysts include, for example, organo-metal compounds of tin, zinc, lead, mercury, cadmium, bismuth, antimony, iron, manganese, cobalt, copper, vanadium and the like such as, for example, metal salts of a carboxylic acid having from about 2 to about 20 carbon atoms including, for example, stannous octoate, dimethyltin dilaurate, dibutyltin dilaurate, dibutyltin diacetate, ferric acetyl acetonate, lead octoate, lead oleate, phenylmercuric propionate, lead naphthenate, manganese naphthenate, copper naphthenate, vanadyl naphthenate, cobalt octoate, cobalt acetate, copper oleate, vanadium pentoxide, mixtures thereof and the like.

Suitable amine catalysts include, for example, triethylenediamine, triethylamine, tetramethylbutanediamine, N,N-dimethylethanolamine, N-ethylmorpholine, bis(2-dimethylaminoethyl)ether, N-methylmorpholine, N-ethylpiperidine, 1,3-bis-(dimethylamino)-2-propanol, N,N,N',N'-tetramethylethylenediamine, mixtures thereof and the like.

Suitable alkali metal alkoxides which can be employed as catalysts for urethane formation include, for example, sodium ethoxide, potassium ethoxide, sodium propoxide, potassium propoxide, sodium butoxide, potassium butoxide, lithium ethoxide, lithium propoxide, lithium butoxide, alkali metal salts of polyols such as described in U.S. Pat. No. 3,728,308, mixtures thereof and the like.

Preferably, these urethane catalysts are in liquid form, but if they are inherently a solid at the application temperature, then they may be dissolved in an appropriate liquid, such as, for example, dipropylene glycol.

The catalysts, when employed, can be employed in quantities of from about 0.001 to about 5, preferably from about 0.01 to about 1 part per 100 parts of total polyol employed depending upon the activity of the catalyst. Very weak catalysts could possibly be employed in quantities above 5 parts per 100 parts of polyol.

Suitable trimerization catalysts which can be employed herein include, for example, the zwitterions disclosed by Kresta and Shen in U.S. Pat. No. 4,111,914 and the tertiary amines, alkali metal salts of lower alkanoic acids, mixtures thereof and the like in U.S. Pat. No. 4,126,741 (Carleton et al) all of which are incorporated herein by reference.

The zwitterions can also function as a catalyst for urethane formation, i.e. the NCX-OH reaction.

If desired, the densities of the urethane elastomers produced herein can be reduced by incorporating a blowing agent into the formulation. Suitable such blowing agents are fully described in U.S. Pat. No. 4,125,487 and in U.S. Pat. No. 3,753,933 and so much of these patents as pertain to blowing agents is incorporated herein by reference. Particularly suitable blowing agents include the low boiling halogenated hydrocarbons such as methylene chloride and trichloromonofluoromethane.

Another suitable method for reducing the density is by frothing by injecting an inert gas into the mixture of urethane forming components. Suitable such inert gases include, for example, nitrogen, oxygen, carbon dioxide, xenon, helium, mixtures thereof such as air and the like.

If desired, cell control agents can be employed, particularly when preparing foams or products of reduced density and/or to assist in paintability of the polyurethane. Suitable cell control agents which can be employed herein include silicone oils such as, for example, DC-193, DC-195, DC-197 and DC-198 commercially available from Dow Corning Corp.; SF-1034, PFA-1635, PFA-1700 and PFA-1660 commercially available from General Electric Co.; and L-520, L-5320 and L-5340 commercially available from Union Carbide Corp.; and B-1048 commercially available from P. H. Goldschmidt, A.G., mixtures thereof and the like.

The polyurethanes of the present invention may additionally contain, if desired, coloring agents, mold release agents, fire retardant agents, fillers, modifiers and the like.

Suitable liquid and solid modifiers are disclosed and described in U.S. Pat. Nos. 4,000,105 and 4,154,716 and so much thereof as pertains to suitable modifier substances are incorporated herein by reference. However, any such modifier described therein which fulfills the definition of any of the other components as described in this application are not considered as modifiers but rather as one of the components of the present invention.

Particularly suitable as the modifier or filler substances are fiberglass reinforcement fibers, particularly those having lengths of from about 1/16 inch (0.16 cm) to about ½ inch (1.27 cm) and milled glass fibers having a maximum length of 1/16 inch (0.16 cm), ⅛ inch (0.32 cm) or ¼ inch (0.64 cm) and the like. Other particularly suitable fillers are mica, wollastonite, and the like.

The components which react to form the polyurethanes of the present invention can be shaped or formed into useful articles by injecting the reactive mixture into molds which are capable of withstanding the exotherm of the polymerizing mass and are non-reactive with and are insoluble when in contact with the liquid reactive mixture. Particularly suitable molds are those made of metal such as aluminum, copper, brass, steel and the like. In some instances non-metal molds can be employed such as those made of, for example, polyethylene, polypropylene, polyethylene terephthalate, silicone elastomers and the like.

The urethane elastomers can be prepared by any of the well known methods such as one shot, quasiprepolymer with hand casting, reaction injection molding (RIM) which includes liquid injection molding (LIM) techniques and the like.

Particularly suitable injection methods for the RIM applications of the present invention include those disclosed in the aforementioned articles by Ludwico et al, Gerkin et al, British patent No. 1,534,258 and the book by F. Melvin Sweeney all of which are incorporated herein by reference.

To prevent the solidifying mass from adhering to the mold surface, it may be necessary to precoat the mold surface with a film of a suitable mold release agent such as, for example, hydrocarbon wax or a polysiloxane formulation or a polytetrafluoroethylene coating, or employ an internal mold release agent in the composition.

When injecting a relatively rapid-setting blend into massive metal molds, it may be necessary for rapid demolding to preheat the molds to an appropriate temperature so that the mold will not abstract the heat of polymerization from the reactive mass and inappropriately delay the solidification time expected of a given formulation. On the other hand, thin wall metal molds could exhibit a minimal "heat sink" effect on relatively large cross section castings and thus, these thin wall metal molds may not require preheating.

The % linear dimensional change is determined by the following procedure.

About five 6"×1"×⅛" (15.24 cm×2.54 cm×0.3175 cm) test strips are obtained from a samp plaque. The strips are placed in a mechanical convection oven, operating at a temperature of 70° C., for a period of 24hours (86400 s) to dry. The strips are then removed and placed in a desiccator for a minimum of 3 hours (10800 s) to cool to room temperature (23° C.).

After being removed from the desiccator, each strip is weighed to the nearest 0.0001 gram and measured in length to the nearest 0.001 inch (0.00254 cm). The strips are then immersed in ~23° C. deionized water. At intervals of 24, 72, and 240 hours (8600 259,200 and 864,000 s) following the initial immersion, the strips are removed from the water, blotted dry, and immediately weighed and measured as in the previous manner. After measurements at 24 and 72 hours (8600 and 259,200 s), the samples are, immediately reimmersed in the deionized water to allow the test to continue. After the 240 hour (864,000 s) measurements, the samples may be discarded.

The following examples are illustrative of the present invention and are not to be construed as to limiting the scope thereof in any manner.

The following components were employed in the examples.

POLYOL A is the reaction product of glycerine and propylene oxide in a molar ratio of about 1 to 6 respectively and having an equivalent weight of about 150.

POLYOL B is the reaction product of polyol A and propylene oxide to an equivalent weight of about 1340 and subsequently end-capped with about 18% by weight of ethylene oxide. The resultant polyol had an equivalent weight of about 1650.

POLYOL C is the reaction product of glycerine and propylene oxide to an equivalent weight of about 1375 and subsequently end-capped with about 13% by weight of ethylene oxide. The resultant polyol had an equivalent weight of about 1589.

POLYOL D is the reaction product of propylene glycol and propylene oxide and having an equivalent weight of about 982.

POLYOL E is the reaction product of dipropylene glycol with 1,2-butylene oxide and having an equivalent weight of about 955.

POLYOL F is a polybutadienediol having an average hydroxyl equivalent weight of about 1249 commercially available from Arco Chemical as a liquid.

POLYOL H is a poly(oxybutylene oxyethylene) glycol base on a propylene glycol initiator synthesized according to the procedures illustrated in Examples 1 and 2 in U.S. Pat. No. 4,301,110 using the reagents of this example at an approximate scale of one tenth of the mass shown in the example. This polyol contained ~46 weight percent oxyethylene moities and ~52 weight percent oxybutylene moities had a hydroxyl number, mg KOH/g, of about 29.3 (OH eq.wt.=~1915) and about 74% of the hydroxyl groups were primary hydroxyl groups.

POLYISOCYANATE A is a liquid, modified diphenylmethane diisocyanate containing a high percentage of pure diphenylmethane diisocyanate and a lesser amount of polycarbodiimide adducts commercially available from The Upjohn Company as ISONATE 143L. The average NCO equivalent weight is about 143.

POLYISOCYANATE B is a liquid, modified diphenylmethane diisocyanate containing a high percentage of pure diphenylmethane diisocyanate and a lesser amount of polycarbodiimide adducts commercially available from Rubicon as Rubinate LF-168. The average NCO equivalent weight is about 143.5.

CATALYST A is lead octoate.

CATALYST B is dibutyltin dilaurate commercially available from M & T Chemicals, Inc. as T-12.

CATALYST C is FOMREZ UL-28 commercially available from Witco Chemical Co.

CATALYST D is a 33% solution of triethylenediamine in dipropylene glycol commercially available from Air Products Co. as DABCO 33LV.

CHAIN EXTENDER A is 1,4-butane diol.

CHAIN EXTENDER B is ethylene glycol.

CHAIN EXTENDER C is the reaction product of propylene glycol and propylene oxide to an equivalent weight of about 200.

CHAIN EXTENDER D is tetraethylene glycol.

A series of urethane elastomers were prepared in the following manner.

Each formulation was cast into a 15"×8"×⅛" (38.1 cm×20.32 cm×0.3175 cm) aluminum mold and demolded after 10 minutes (600 s) at 250° F. (121.1° C.). Each sheet was then allowed to cure an additional 50 minutes (3000 s) at 250° F. (121.1° C.) immediately following demolding. Parts were then allowed to cool about 24 hours (86400 s) to about 72° F. (22.2° C.). Each plaque was then cut into 5, 6"×1"×⅛" (15.24 cm×2.54 cm×0.3175 cm.) strips which were collectively dried at 158° F. (70° C.) for 24 hours (86400 s) in a convection oven, and then allowed to cool for 3 hours (10800 s) at 72° F. (22.2° C.) in a dry box. Strips were then measured in length to the nearest 0.001" (0.00254 cm), immersed in 72° F. (22.2° C.) deionized water, periodically removed, blotted dry, and remeasured. Percent length changes were then calculated by the formula $$\%(\Delta L) = \frac{L_t - L_o}{L_o} \times 100\%$$

where

%(ΔL)=percent length change $L_t$=length of a strip t hours following immersion in water $L_o$=length of the same strip just prior to initial immersion.

The composition and results are given in the following Table.

TABLE I

| EXAMPLE NUMBER OR COMPARATIVE EXPERIMENT LETTER | HIGH MW POLYOL | | | CHAIN EXTENDER Type/pbw[1]/equiv. | POLYISOCYANATE Type/pbw[1]/equiv. | CATALYST type/gms | % ΔL[2] 240 HOURS (864000 s) |
|---|---|---|---|---|---|---|---|
| | Type/pbw[1]/equiv. | Approx. wt. % E.O.[4] | Approx. wt. % B.O.[5] | | | | |
| A | B/150/0.0909 | 18 | 0 | A/30/0.6667 | A/108.34/0.758 | B/0.18 | 1.13 |
| B | C/150/0.0947 | 14 | 0 | A/30/0.6667 | A/108.88/0.761 | B/0.18 | 0.88 |
| C | D/150/0.1527 | 0 | 0 | A/30/0.6667 | A/117.17/0.819 | B/0.18 | 0.69 |
| 1 | E/150/0.1571 | 0 | 96 | A/30/0.6667 | A/117.79/0.824 | A/0.9 B/0.9 | 0.29 |
| 2 | E/100/0.1017 | 0 | 96 | C/100/0.500 | B/86.35/0.6017 | A/06 D/06 | 0.37 |
| 3 | E/20/0.0203 D/180/0.1804 | 0 | 9.6 | A/40/0.8889 | B/156.25/1.0869 | A/0.36 | 0.58 |
| 4 | E/100/0.1017 | 0 | 96 | A/20/0.4444 | A/78.37/0.5461 | A/0.6 C/0.6 | 0.32 |
| 5 | E/100/0.1017 | 0 | 96 | D/100/0.9700 | B/153.79/1.0717 | A/1.0 C/1.0 | 0.58 |
| D | B/100/0.0606 | 18 | 0 | B/18/0.5806 | A/94.52/0.661 | C/0.20 | 0.97[3] |
| E | D/100/0.1018 | 0 | 0 | B/18/0.5806 | A/99.96/0.699 | A/0.08 C/0.20 D/0.18 | 0.60[3] |
| F | H/150/0.0783 | 46 | 52 | A/30/0.6667 | B/106.9/0.745 | A/0.09 | 2.04 |
| G | H/150/0.0783 | 46 | 52 | B/30/0.9677 | B/150.1/1.046 | A/0.09 B/0.09 | 1.21 |
| H | H/150/0.0783 | 46 | 52 | B/20.7/0.6667 | B/106.9/0.745 | A/0.09 | 1.63 |

TABLE I-continued

| EXAMPLE NUMBER OR COMPARATIVE EXPERIMENT LETTER | HIGH MW POLYOL | | | CHAIN EXTENDER Type/pbw[1]/equiv. | POLYISOCYANATE Type/pbw[1]/equiv. | CATALYST type/gms | % $\Delta L^2$ 240 HOURS (864000 s) |
|---|---|---|---|---|---|---|---|
| | Type/pbw[1]/equiv. | Approx. wt. % E.O.[4] | Approx. wt. % B.O.[5] | | | | |
| | | | | | | B/0.09 | |

[1] pbw = parts by weight.
[2] Average of 5 samples.
[3] Average of 2 samples.
[4] E.O. means oxyethylene moieties.
[5] B.O. means oxybutylene moieties.

We claim:

1. A urethane elastomer prepared from a composition comprising (A) a high equivalent weight polyether polyol or polyol mixture which contains less than about 10 percent by weight oxyethylene moieties and which contains at least about 10 percent by weight oxybutylene moieties, (B) at least one chain extender and (C) at least one polyisocyanate or polyisothiocyanate and wherein said urethane elastomer has a percent linear dimensional change after being immersed in deionized water for 240 hours (864000 s) at 72° F. (22.2° C.) of less than about 0.6%, said linear dimensional change being the average value of at least 2 specimens of the dimension 6"×1"×⅛" (15.24 cm×2.54 cm×0.3175 cm) which have been post heated at 158° F. (70° C..) for 24 hours (86400 s) followed by cooling in a dry box for 3 hours (10800 s) at 72° F. (22.2° C..) prior to immersion in said deionized water.

2. A urethane elastomer prepared from a composition comprising (A) a high equivalent weight polyether polyol or polyol mixture which contains less than about 10 percent by weight oxyethylene moieties and which contains at least about 10 percent by weight oxybutylene moieties, (B) at least one chain extender and (C.) at least one polyisocyanate or polyisothiocyanate and wherein said urethane elastomer has a percent linear dimensional change after being immersed in deionized water for 240 hours (864000 s) at 72° F. (22.2° C.) of not greater than about 0.5%, said linear dimensional change being the average value of at least 2 specimens of the dimension 6"×1"×⅛" (15.24 cm×2.54 cm×0.3175 cm) which have been post heated at 158° F. (70° C.) for 24hours (86400 s) followed by cooling in a dry box for 3 hours (10800 s) at 72° F. (22.2° C.) prior to immersion in said deionized water.

3. A urethane elastomer prepared from a composition comprising (A) a high equivalent weight polyether polyol or polyol mixture which contains less than about 10 percent by weight oxyethylene moieties and which contains at least about 10 percent by weight oxybutylene moieties, (B) at least one chain extender and (C.) at least one polyisocyanate or polyisothiocyanate and wherein said urethane elastomer has a percent linear dimensional change after being immersed in deionized water for 240 hours (864000 s) at 72° F. (22.2° C.) of not greater than about 0.3%, said linear dimensional change being the average value of at least 2 specimens of the dimension 6"×1"×⅛" (15.24 cm×2.54 cm×0.3175 cm) which have been post heated at 158° F. (70° C.) for 24 hours (86400 s) followed by cooling in a dry box for 3 hours (10800 s) at 72° F. (22.2° C.) prior to immersion in said deionized water.

4. A urethane elastomer of claims 1, 2 or 3 wherein component (A) contains less than about 5 percent by weight oxyethylene moieties and at least about 20 percent by weight oxybutylene moieties.

5. A urethane elastomer of claims 1, 2, or 3 wherein component A is a polyether polyol having an average hydroxyl functionality of from about 2 to about 4 and an average hydroxyl equivalent weight of about 1000 to about 3000 and component (B) is selected from
  (1) hydroxyl-containing materials having from 2 to about 8 hydroxyl groups per molecule;
  (2) aliphatic amine-containing materials having at least one primary amine group, an average aliphatic amine hydrogen functionality of from about 2 to about 16 and an average aliphatic amine hydrogen equivalent weight of from about 15 to about 500;
  (3) aromatic amine-containing materials which are essentially free of aliphatic amine hydrogen atoms and which contain at least two aromatic amine hydrogen atoms; and
  (4) compounds having at least one hydroxyl and at least one primary amine group per molecule.

6. A urethane elastomer of claim 5 wherein
  (i) component A contains a polyether polyol having an average hydroxyl functionality of from about 2 to about 3 and an average hydroxyl equivalent weight of from about 1500 to about 2500;
  (ii) component B-1 has an average hydroxyl functionality of from about 2 to about 3 and an average hydroxyl equivalent weight of from about 30 to about 70;
  (iii) component B-2 is an aliphatic amine-containing material having an average aliphatic amine hydrogen functionality of from about 2 to about 12 and an average aliphatic amine hydrogen equivalent weight of from about 50 to about 200; and
  (iv) component C. is a polyisocyanate.

7. A urethane elastomer of claim 6 wherein
  (i) said polyether polyol of component A has an average functionality of from about 2 to about 4 and an average hydroxyl equivalent weight of from about 1000 to about 3000;
  (ii) component B-1 has an average hydroxyl functionality of about 2 and an average hydroxyl equivalent weight of from about 30 to about 50; and
  (iii) component B-2 has an average aliphatic amine hydrogen functionality of from about 4 to about 8 and an average aliphatic amine hydrogen equivalent weight of from about 80 to about 150.

8. A urethane elastomer of claim 7 wherein component A has an average hydroxyl functionality of from about 2 to about 3 and an average hydroxyl equivalent weight of from about 1500 to about 2500.

9. A urethane elastomer of claim 8 wherein component A contains a polyoxyalkylene glycol or a glycerine or trimethylolpropane initiated polyoxyalkylenepolyol.

10. A urethane elastomer of claim 5 wherein component (A) contains less than about 5 percent by weight oxyethylene moities and at least about 20 percent by weight oxybutylene moities.

11. A urethane elastomer of claim 6 wherein component (A) contains less than about 5 percent by weight oxyethylene moities and at least about 20 percent by weight oxybutylene moities.

12. A urethane elastomer of claim 7 wherein component (A) contains less than about 5 percent by weight oxyethylene moities and at least about 20 percent by weight oxybutylene moities.

13. A urethane elastomer of claim 8 wherein component (A) contains less than about 5 percent by weight oxyethylene moities and at least about 20 percent by weight oxybutylene moities.

14. A urethane elastomer of claim 9 wherein component (A) contains less than about 5 percent by weight oxyethylene moities and at least about 20 percent by weight oxybutylene moities.

* * * * *